R. C. Bristol,

Steam Balanced Valve.

No. 891. Reissued Feb. 7, 1860.

Witnesses.

J. L. Forgo

A. G. Warner

Inventor.

R. C. Bristol

N. PETERS, PHOTO-LITHOGRAPHER, WASHINGTON, D. C.

UNITED STATES PATENT OFFICE.

RICHARD C. BRISTOL, OF CHICAGO, ILLINOIS.

IMPROVEMENT IN SLIDE-VAVLES FOR STEAM-ENGINES.

Specification forming part of Letters Patent No. 24,439, dated June 21, 1859; Reissue No. 891, dated February 7, 1860.

*To all whom it may concern:*

Be it known that I, RICHARD C. BRISTOL, of Chicago, in the county of Cook and State of Illinois, have invented a new and useful Improvement in Slide-Valves for Steam and Gas Engines; and I do hereby declare that the following is a full and exact description of the construction and operation of the same, reference being had to the accompanying drawings, forming a part of this specification, in which—

Figure 1:
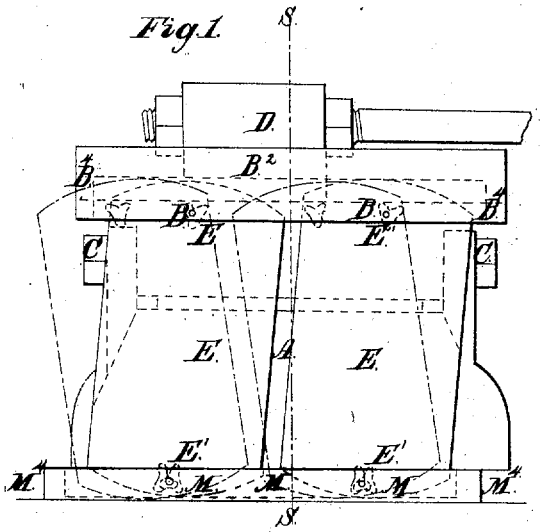
Figure 2:
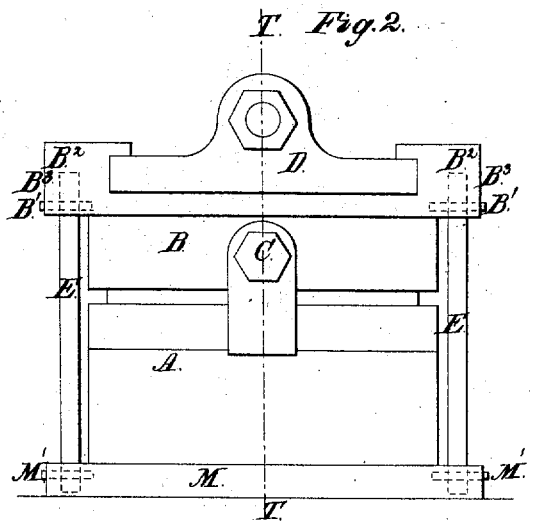
Figure 3:
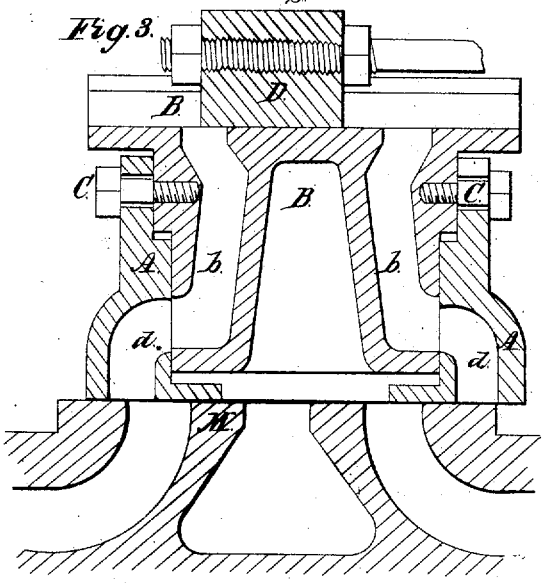
Figure 4:
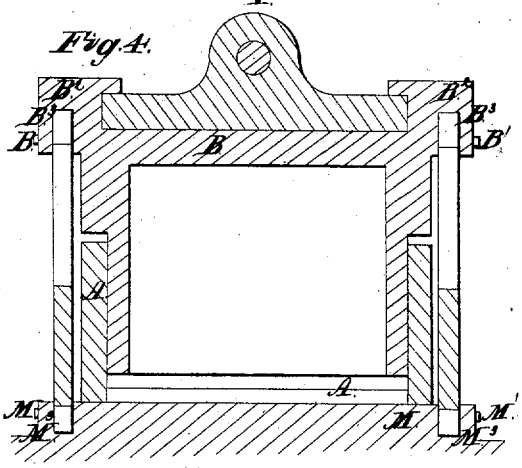

Figure 1 is a side elevation, reckoning relatively to its motion. Fig. 2 is an end elevation. Fig. 3 is a vertical section on the line T T in Fig. 2, and Fig. 4 is a vertical section on the line S S in Fig. 1.

Similar letters of reference indicate like parts in all the drawings.

It is well known that the pressure of steam upon a slide-valve tends to produce a great amount of friction, and various devices have been made known with a view to diminish this injurious effect. One of these has been to construct upon the back of the valve a short cylinder with a piston working therein, which, being suspended by a link attached to the cover of an elevated steam-chest, relieves the valve from much of the pressure of the steam. Another way has been to mount the piston of such a valve upon wheels running in ways parallel to the face of the valve. These and other previously-known devices have either been expensive in construction or have but imperfectly accomplished the object, or both, while they have necessitated an unusually capacious steam-chest, thus rendering the expansion of the steam, when an independent cut-off is used, less effectual; and in no case, when the pressure has been supported from off the valve, has the very common and desirable plan been practicable of working a cut-off valve on the back of the main slide-valve.

The nature of my invention consists in employing in lieu of wheels four or more partial rollers which are not subject to any friction upon their axes, neither do they compel any increase in the length of the steam-chest. My partial rollers are circular or cylindrical through so large portions of their periphery as to allow the valve to travel thereon to the full extent of its motion. The remainder of the periphery is reduced in diameter, so that these partial rollers may be placed much nearer together and a much larger effective diameter thereof may be adopted, as also a shorter steam-chest, than with wheels. These partial rollers are also guided and kept in position at or near their bearing-points, so that they are not, like ordinary rollers, liable to any possibility of displacement.

The nature of my invention consists, also, in providing the valve, or the back piece thereof, with overhanging lips $B^2$ at each side, and with depending lips or equivalent stops $B^4$ at each end, whereby the pressure of the steam upon the back of the valve, or upon a loose back piece thereof, is transmitted to rolling supports on each side, and the rolling supports are also controlled and kept in place.

The nature of my invention also consists in so arranging a cut-off on the back of the supported part, and so arranging suitable passages through the parts of the valve, that the steam is conveyed to the cylinder-ports through such passages alone, with the usual effect due to expansive working, while the two parts of the valve may be allowed to work to a limited extent relatively to each other without involving a leakage of steam at the joints. As balanced slide-valves have been constructed, such a result has been impossible.

The nature of my invention likewise also consists in a process of adjusting the two parts of the valve before working it, or after working it for a period with the two parts in free relation to each other.

The adjustment of similar valves has been heretofore produced by the pressure of the steam upon a certain portion not balanced or relieved. As the friction of one part within the other is liable to be very considerable, it has, in order to secure a proper adjustment, been necessary to leave a large portion of the face-piece uncovered by the back piece or piston, and consequently unrelieved from pressure, which, upon the portion thus situated, has produced a continuous friction between the valve-face and cylinder-face. My invention overcomes this difficulty by causing a rigid union, or nearly so, of the two parts of the valve after the face-piece has assumed the proper position for a tight contact with the cylinder-face.

To enable others skilled in the art to mak and use my invention, I will proceed to describe, by the aid of the drawings, the manner in which I construct and operate it.

The valve proper is constructed in two portions, A and B, the latter being fitted steam-tight into the former, so that it is adapted to slide vertically therein to a certain extent, as represented, without allowing steam to pass through the joint. Set-screws C C are provided, by which the portions A and B may be made to hold their relative places very firmly, if required. The cut-off valve D is fitted to slide steam-tight on the upper face of B, and is guided thereon by ledges or lips. The top of B overhangs A at each side, as represented by $B^2$ $B^3$, and the partial rollers which are introduced between these overhanging portions and the cylinder face M support B on the circular portions of their several peripheries and compel it to travel in a plane parallel to the face M. The form which I prefer for these partial rollers is shown in Figs. 1 and 2, a part being shown by strong and a part by dotted lines in each figure. The overhanging portions of B are made to inclose and confine the upper sides or circular ends of these partial rollers, as shown by $B^2$, $B^3$, and $B^4$, and the lower sides, or lower circular ends thereof, are inclosed or confined by analogous means, $M^2$, $M^3$, and $M^4$, on or near the cylinder-face. I also make suitable apertures, E′, through the partial rollers E, near their extremities, and insert pins B′ B′, which extend through these slots into the metal of the back piece, B, and similar pins, M′, which extend into the metal of the cylinder-face M. These apertures or slots are of such length and such form as to allow the partial rollers to play to the proper extent without touching the pins so long as the partial rollers are in their correct positions; but the moment one of these partial rollers becomes in any considerable degree displaced at either the top or the bottom it presses the sides of the corresponding slot against the pin, and thus prevents itself from becoming more displaced.

Any sensible displacement of either of the or partial rollers also causes it to meet the other to meet a stop, B, at each vibration, and thus to aid in preventing it from becoming any further displaced. The red outlines show the condition of these partial rollers at the end of each movement of the valve.

The steam is admitted to the ports in the cylinder through the passages *a a* and *v v* in the respective parts A B. These passages are arranged as represented, so that the part A may slide vertically upon B, and vice versa, without closing the passages *a b*, and without producing any leak at the joint or dividing line.

In commencing to operate my valve the set screws C C are slackened, and the part A is thus allowed to be pressed down into steam-tight contact with the cylinder-face M by the pressure of the steam on that part of A which s not protected therefrom by B. It is usually worked for several days in this condition, so that it is free to rise and sink without affecting B, and is then (either at a single operation or by gradually increasing the tightness at several operations) set firmly in relation to B, by turning the set screws C C, in which case it continues to fit tightly upon the cylinder-face M, by reason that the motion of B is parallel thereto.

It will readily be seen that my invention is capable of being constructed in various forms and proportions other than those which I have here represented. For example, any variety of cut-off device which is suitable to work on the back or within the body of other slide-valves may be employed in my invention as the valve D, instead of the precise form and proportion which I have represented. Broad heads may also be forged on the pins B′ and M′, which pins may be threaded and tapped into the respective parts so as to become bolts, and thus a lateral play of the partial rollers E may be prevented by the heads of these bolts in lieu of by the lips $B^2$ and $M^3$, as represented. Many other modifications may readily be adopted without varying substantially from the principal features of my invention.

I do not claim sustaining a portion on the whole of the pressure upon a slide-valve by the use of wheels or of ordinary rollers; but,

Having now fully described my invention, what I claim as new therein, and desire to secure by Letters Patent, is—

1. The construction and arrangement of the partial rollers E, when sustained in their respective positions substantially in the manner and for the purposes herein set forth.

2. Providing a slide-valve with lips $B^2$ and stops $B^4$, substantially as herein shown and described, for the purpose of sustaining the pressure of the steam thereon upon the rolling supports E, or their equivalents, and of confining the rolling supports to prevent their becoming displaced.

3. I do not claim the employment of a cut-off valve, D, sliding on the back of a valve having passages through which the steam is admitted to the ports in the cylinder under the control of both valves; but I claim the within-described arrangement of the supported back piece, B, loose face-piece A, cutting-off means D, and the united passages, *a b*, in the respective parts A B, whereby the parts A B are allowed to work to a limited extent relatively to each other without affecting the action of the steam, nor allowing any escape of the same through the joint.

4. Rigidly connecting the parts A and B, after they have been properly adjusted, by means of the set-screws C C, or their equivalents, substantially as and for the purposes herein set forth.

R. C. BRISTOL.

Witnesses:
J. L. FARGO,
A. G. WARNER.